THERMO-RESISTIVE RECORDING TECHNIQUE
Filed Dec. 27, 1965

INVENTOR
DONALD T. BEST
BY Fred Fisher
ATTORNEY

United States Patent Office 3,511,973

Patented May 12, 1970

3,511,973

THERMO-RESISTIVE RECORDING TECHNIQUE

Donald T. Best, Plymouth Meeting, Pa., assignor to Sperry Rand Corporation, New York, N.Y., a corporation of Delaware Filed Dec. 27, 1965, Ser. No. 516,368
Int. Cl. G06k 7/00
U.S. Cl. 235—61.11 1 Claim

ABSTRACT OF THE DISCLOSURE

This invention relates to a recording scheme whereby the recording medium comprises an electrical resistive material of constant isotropic resistivity. Information is recorded on the medium by altering the resistivity thereof. Read out of the information occurs by scanning the medium to detect any changes of resistivity with thermographic equipment.

This invention relates to recording systems and record cards.

Electronic data processing systems utilize peripheral input/output equipment, such as card punches and card readers, wherein individual cards can have information encoded therein by means of punches and whereby the punched holes can be read by an appropriate reading mechanism.

Card punches, generally, have large cross-sectional areas, thereby providing rigidity for long use and wear. Thus, a low density of information is recorded on such a card.

It is a purpose of this invention to provide a novel system whereby information can be recorded at a high density on an inexpensive record card.

In accordance with one embodiment of this invention, a record card is constructed with a surface of uniform resistive material having a linear isotropic resistivity, the opposite ends of the card having metalized strips of high conductivity in contact with the resistive surface.

Information is encoded upon the card, in the form of spots, by altering its resistivity by suitable means, such as mechanical impact, hot probe, application of a high potential, chemical means, or the like. Information is read from the card by applying a potential across the metalized strips creating a nearly uniform current density along the surface of the card and causing the temperature at the surface to rise. At those spots on the card where the resistivity has been changed, the temperature is different from the card as a whole. The temperature difference is detected by standard scanning thermographic equipment which provides an output electrical signal in a raster form, which electrical signal contains information corresponding to that recorded upon the card.

Other objects and advantages of this invention, together with its construction and mode of operation, will become more apparent from the following description, when read in conjunction with the acompanying drawing, in which.

Figure 1:
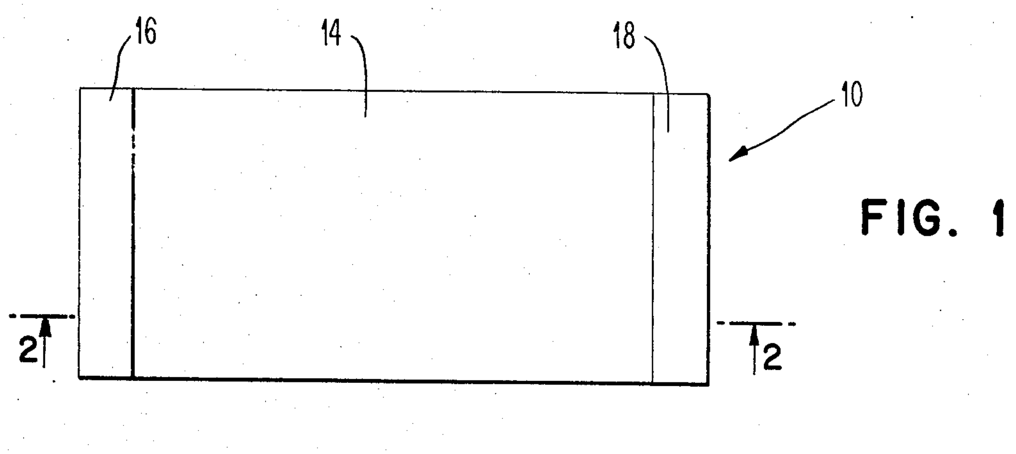
FIG. 1 is a plan view of a record card constructed in accordance with one embodiment of this invention.
Figure 2:
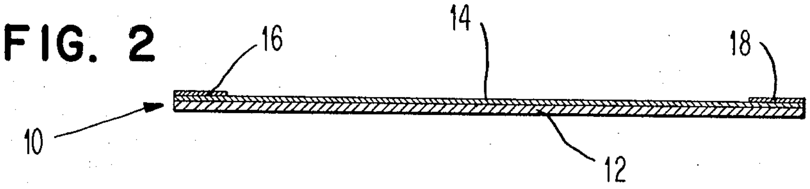
FIG. 2 is a cross-sectional view of the record card of FIG. 1 taken along the lines 2—2 thereof.

Referring to FIGS. 1 and 2, there is shown a record card 10. In one embodiment, the record card 10 is constructed of homogeneous resistive material such, for example, as that used in the making of Teledeltos paper. In another embodiment, illustrated in FIG. 2, the record card 10 includes a base material 12 uniformly coated with a resistive material 14 of linear isotropic resistivity.

Metalized strips 16, 18 are affixed to the ends of the card 10 in contact with the resistive material 14. This may be accomplished for example by the method of electroless plating followed by electroplating. The strips 16, 18 are highly conductive so that, upon application of a potential thereto, the strips, per se, are equipotentials to within a small percentage of the applied voltage. Metalized strips 16, 18 are formed in good contact with the resistive material 14 so that the card 10, for practical purposes, is a flat film resistor.

The resistive material 14 is selected so that its resistivity is appreciably altered by either a mechanical impact, hot probe, application of a high potential, or chemical means. Information is encoded on the card 10 in the form of spots using the appropriate one of the aforementioned techniques.

Figure 3:
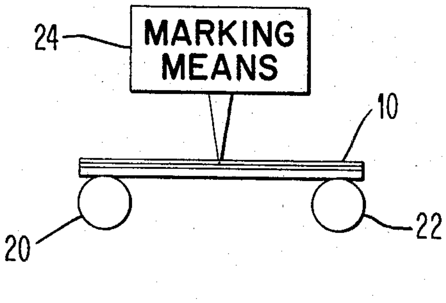
FIG. 3 is a schematic diagram illustrating means for the recording of information upon the record card by appropriate means.

FIG. 3 illustrates, schematically, a card 10 which can be transferred through a marking station by means of appropriate rollers 20, 22. Spots of altered resistivity are recorded on the card 10 at the marking station by a suitable marking means 24, such as a mechanical impact device, a hot probe, application of a high potential, or chemical means. In a preferred embodiment, the marking means 24 is a plurality of small pins so that, upon impact, the small pins alter the resistivity of the coating 14 on the card 10.

Figure 4:
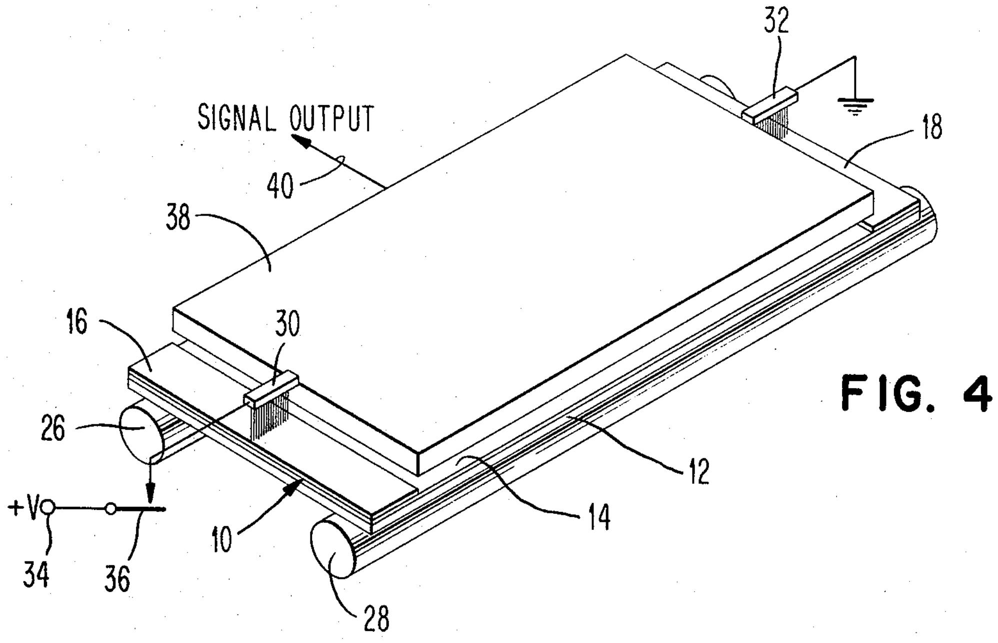
FIG. 4 is a perspective view illustrating means for the reading of information from the record card such as is illustrated in FIG. 1.

FIG. 4 illustrates, schematically, the card 10 at a reading station. The card 10 can be transferred by appropriate rollers 26, 28. A contact brush 30 is adapted to contact the metalized strip 16 of the card 10. Another contact brush 32 is adapted to contact the card 10 at the opposite metalized strip 18. A voltage potential is applied across the card 10 at the contact brushes 30, 32, as for example by coupling a voltage source 34 of approximately 24 volts through a switch 36 to the contact brush 30 and by coupling the contact brush 32 to a point of reference potential, such as ground.

The application of a potential across the card 10 creates a nearly uniform current density along its surface 14 and its temperature rises. At those spots where the resistivity has been altered, the temperature differs from the remainder of the card 10, since, for example, highly conductive spots are cooler than the ambient portions. Thus, upon application of a potential across the card 10, the differences of the resistivity along the surface 14 of the card 10 are translated into heat changes and the changes in its temperature can be detected by scanning thermographic equipment. The thermographic equipment may comprise, by way of example, a target-scanning mirror. Radiation power emitted from the target is projected by the optic system into a radiometer. There the radiation is converted to an A.C. signal which is amplified. The mirror moves horizontally from left to right while slowly tilting in the vertical direction. As the mirror returns quickly to its initial position, the electronic picture is blanketed out; thus a horizontal raster similar to that seen on a television receiver is produced. It should be understood that other scanning techniques than that described may be readily devised and used by those skilled in the art.

Scanning thermographic equipment 38 such as made by Barnes Engineering and whose temperature sensitivity is on the order of .5° C. is oriented in engagement with the card 10 so as to detect the changes of temperature of the document 10 as a whole, scanning the surface of the card 10, line by line, in a manner similar to television scanning. The second temperature changes are transferred into an electrical output signal along a lead 40, which output signal can be of a raster form, indicative of the information recorded on the card 10.

Present day commercial scanning thermographic equipment is available that can scan at a rate of 800 lines per inch. Thus, by practicing the teachings of this invention, bit density can approach 640,000 bits per square inch. By way of contrast, the standard Hollerith 80 column/12 position card has a bit density of approximately 40 bits per square inch.

Thus, there has been described a novel system wherein record cards have their electrical resistivity varied to record information and wherein the electrical resistivity is sensed by thermographic means.

In a recording mode, it is noted that it is unnecessary to apply a potential between the strips 16, 18; however, the application of a potential across the strips 16, 18 does not affect a writing operation.

Various modifications will suggest themselves to those ordinarily skilled in the art. For example, an entire card of resistive material can be utilized. In the preferred embodiment, the insulative base 12 is coated with a thin llm of resistive material 14 since, by using such a thin film, it is easier to change resistive values, whereby greater contrast is obtainable therefrom.

Other modifications, for example, can include record cards in the form of tape wherein the sides of the tape are metalized and its surface scanned with scanning thermographic equipment in a manner similar to videotape recording. As used in the claim, the term "card" includes tape.

The embodiments of the invention in which an exclusive property or privilege is claimed are defined as follows:

1. In combination, (a) a substantially rectangular record card, one of said card including a resistive material of constant, isotropic resistivity;

(b) a first equipotential conductive strip of material affixed to said one surface on one side of said card; and (c) a second equipotential conductive strip of material affixed to said one surface on a side opposite to said one side;

(d) first transducer means for engagement with said card for recording information upon said card comprising (i) means for altering the resistive characteristic of said resistive material; and (e) second transducer means for engagement with said card for reading information recorded therein in the form of non-uniform areas of resistivity including (i) means for applying a potential across said first and second strips of conductive material; and (ii) scanning thermographic means for reading the temperature changes produced on said one surface of said card by the application of said potential, and for providing an output signal corresponding to said temperature changes.

References Cited

UNITED STATES PATENTS

| | | | |
|---|---|---|---|
| 2,084,238 | 6/1937 | Best | 235—61.12 XR |
| 2,448,761 | 9/1948 | Armbruster | 235—61.12 |
| 2,613,252 | 10/1952 | Heibel. | |
| 2,748,487 | 6/1956 | Zimmermann. | |
| 3,245,054 | 4/1966 | Byron et al. | |
| 3,265,524 | 8/1966 | Geheagaray | 346—135 XR |
| 2,542,478 | 2/1951 | Clark | 338—308 XR |
| 2,777,044 | 1/1957 | Lytle | 338—308 XR |
| 3,099,578 | 7/1963 | Hunter | 338—308 XR |
| 3,074,066 | 1/1963 | Conerly. | |
| 3,119,919 | 1/1964 | Pratt. | |
| 3,253,126 | 5/1966 | Baughman | 235—61.15 |

DARYL W. CLARK, Primary Examiner

R. M. KILGORE, Assistant Examiner

U.S. Cl. X.R.

235—61.12; 340—173; 346—74